United States Patent
Robinson et al.

(10) Patent No.: US 7,254,116 B2
(45) Date of Patent: Aug. 7, 2007

(54) METHOD AND APPARATUS FOR TRANSCEIVER NOISE REDUCTION IN A FRAME-BASED COMMUNICATIONS NETWORK

(75) Inventors: Timothy B. Robinson, Boulder Creek, CA (US); Dane R. Snow, Santa Clara, CA (US); Jason Alexander Trachewsky, Menlo Park, CA (US); Larry C. Yamano, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 872 days.

(21) Appl. No.: 09/825,638

(22) Filed: Apr. 4, 2001

(65) Prior Publication Data
US 2001/0046289 A1    Nov. 29, 2001

Related U.S. Application Data

(60) Provisional application No. 60/197,224, filed on Apr. 14, 2000, provisional application No. 60/196,002, filed on Apr. 7, 2000.

(51) Int. Cl.
*H04B 7/00*   (2006.01)
*H04B 3/20*   (2006.01)
*H04L 12/66*  (2006.01)

(52) U.S. Cl. .................. 370/278; 370/287; 370/289; 370/356

(58) Field of Classification Search ............... 370/282, 370/286, 287–290, 284, 201; 379/406.8, 379/416, 404
See application file for complete search history.

(56) References Cited

U.S. PATENT DOCUMENTS

| 4,178,569 A | 12/1979 | Reutter et al. |
| 4,378,472 A | 3/1983 | Lechner |
| 4,595,802 A | 6/1986 | Wittman |
| 5,077,732 A | 12/1991 | Fischer et al. |
| 5,220,565 A | 6/1993 | Wilson et al. |
| 5,274,704 A | 12/1993 | Jakab |
| 5,416,808 A | 5/1995 | Witsaman et al. |
| 5,528,630 A | 6/1996 | Ashley et al. |

(Continued)

FOREIGN PATENT DOCUMENTS

EP        938 207 A2   8/1999

(Continued)

OTHER PUBLICATIONS

J. Carlson, et al., "PPP over Simple Data Link (SDL) using SONET/SDH with ATM-like framing," *Internet Draft*, Nov. 1998, p. 1-21.

(Continued)

*Primary Examiner*—Chi Pham
*Assistant Examiner*—Melanie Jagannathan

(57) ABSTRACT

A method of and apparatus for noise reduction for a transceiver transmitting frames over a transmission medium in a frame-based communications network. A transceiver transmit path and a transceiver receive path is provided. A blocking switch is located in the transceiver transmit path, the blocking switch allowing transmit signal propagation when enabled, while preventing both transmit signal propagation and circuit device noise coupling from the transceiver transmit path to the transceiver receive path when the blocking switch is disabled. The blocking switch is disabled when the transceiver transmit path is not transmitting frames over the frame-based communications network.

10 Claims, 15 Drawing Sheets

U.S. PATENT DOCUMENTS

| | | | |
|---|---|---|---|
| 5,537,410 A | 7/1996 | Li | |
| 5,566,180 A | 10/1996 | Eidson et al. | |
| 5,646,947 A | 7/1997 | Cooper et al. | |
| 5,673,266 A | 9/1997 | Li | |
| 5,712,853 A | 1/1998 | Mathur et al. | |
| 5,734,833 A | 3/1998 | Chiu et al. | |
| 5,809,009 A | 9/1998 | Matsuoka et al. | |
| 5,815,501 A | 9/1998 | Gaddis et al. | |
| 5,854,900 A | 12/1998 | Kalkunte et al. | |
| 5,894,481 A | 4/1999 | Book | |
| 5,909,489 A * | 6/1999 | Matt et al. | 379/406.08 |
| 5,915,097 A | 6/1999 | Chao | |
| 5,933,425 A | 8/1999 | Iwata | |
| 5,948,065 A | 9/1999 | Eilert et al. | |
| 5,974,056 A | 10/1999 | Wilson et al. | |
| 5,991,269 A | 11/1999 | Williamson et al. | |
| 6,009,468 A | 12/1999 | Lau et al. | |
| 6,134,232 A | 10/2000 | Ashley et al. | |
| 6,141,353 A | 10/2000 | Li | |
| 6,175,590 B1 | 1/2001 | Stein | |
| 6,222,841 B1 | 4/2001 | Taniguchi | |
| 6,233,248 B1 | 5/2001 | Sautter et al. | |
| 6,243,454 B1 * | 6/2001 | Eslambolchi | 379/202.01 |
| 6,259,677 B1 | 7/2001 | Jain | |
| 6,292,517 B1 | 9/2001 | Jeffress | |
| 6,301,291 B1 | 10/2001 | Rouphael et al. | |
| 6,327,274 B1 | 12/2001 | Ravikanth | |
| 6,343,126 B1 * | 1/2002 | Stelman | 379/399.01 |
| 6,345,327 B1 | 2/2002 | Baskey et al. | |
| 6,411,664 B1 | 6/2002 | Usui et al. | |
| 6,427,169 B1 | 7/2002 | Elzur | |
| 6,449,291 B1 | 9/2002 | Burns et al. | |
| 6,449,688 B1 | 9/2002 | Peters et al. | |
| 6,456,646 B1 | 9/2002 | Asokan et al. | |
| 6,459,684 B1 * | 10/2002 | Conroy et al. | 370/286 |
| 6,459,790 B1 * | 10/2002 | Eckert et al. | 379/416 |
| 6,463,141 B1 | 10/2002 | Tuunanen et al. | |
| 6,480,681 B1 | 11/2002 | Neil | |
| 6,504,851 B1 | 1/2003 | Abler et al. | |
| 6,522,665 B1 | 2/2003 | Suzuki et al. | |
| 6,545,781 B1 | 4/2003 | Chang et al. | |
| 6,563,886 B1 | 5/2003 | Kubo et al. | |
| 6,608,827 B1 | 8/2003 | Austin | |
| 6,611,519 B1 | 8/2003 | Howe | |
| 6,625,239 B1 | 9/2003 | Shiraishi et al. | |
| 6,657,757 B1 | 12/2003 | Chang et al. | |
| 6,661,810 B1 | 12/2003 | Skelly et al. | |
| 6,661,811 B1 | 12/2003 | Baker et al. | |
| 6,665,316 B1 | 12/2003 | Eidson | |
| 6,674,747 B1 | 1/2004 | Lassaux et al. | |
| 6,678,248 B1 | 1/2004 | Haddock et al. | |
| 6,687,745 B1 | 2/2004 | Franco et al. | |
| 6,690,655 B1 | 2/2004 | Miner et al. | |
| 6,697,378 B1 | 2/2004 | Patel | |
| 6,744,884 B1 * | 6/2004 | Bjarnason | 379/406.01 |
| 6,747,996 B2 | 6/2004 | Holloway et al. | |
| 6,754,256 B1 | 6/2004 | Kubo et al. | |
| 6,757,291 B1 | 6/2004 | Hu | |
| 6,757,894 B2 | 6/2004 | Eylon et al. | |
| 6,760,434 B1 | 7/2004 | Rezvani et al. | |
| 6,765,931 B1 * | 7/2004 | Rabenko et al. | 370/493 |
| 6,768,721 B1 | 7/2004 | Schmitz et al. | |
| 6,785,350 B1 | 8/2004 | Poulbere et al. | |
| 6,810,428 B1 | 10/2004 | Larsen et al. | |
| 6,819,655 B1 | 11/2004 | Gregson | |
| 6,888,883 B1 * | 5/2005 | Schwartzman et al. | 375/222 |
| 2002/0027886 A1 | 3/2002 | Fischer et al. | |
| 2002/0031123 A1 | 3/2002 | Watanabe et al. | |
| 2002/0041570 A1 | 4/2002 | Ptasinski et al. | |
| 2003/0133439 A1 | 7/2003 | Huang et al. | |
| 2004/0062225 A1 | 4/2004 | Ling et al. | |
| 2004/0081191 A1 | 4/2004 | Kwon et al. | |

FOREIGN PATENT DOCUMENTS

| | | |
|---|---|---|
| WO | WO 99/20016 | 4/1999 |
| WO | WO-9960755 A1 | 11/1999 |

OTHER PUBLICATIONS

Frank, E. H., et al., "Connecting the Home With a Phone Line Network Chip Set", *IEEE MICRO*, (Mar.-Apr. 2000),2-14.

Loh, L., et al., "Quality of Support and Priority Management in HomePNA 2.0 Link Layer", *ISCC'03*, 2003, (2003), 1-16.

Minassian, G., "Home Phone Line Network: The Next Networking Challenge", *Electronic Product Design*, (Nov. 1998),1-4.

"Home Phoneline Networking Alliance", *Interface Specification for HomePNA 2.0 10M8 Technology Link Layer Protocol*, (Dec. 1, 1999), 1-39.

"Home Phoneline Networking Alliance", *Interface Specification for HomePNA 2.0 10M8 Technology*, (Dec. 1, 1999), 1-77.

* cited by examiner

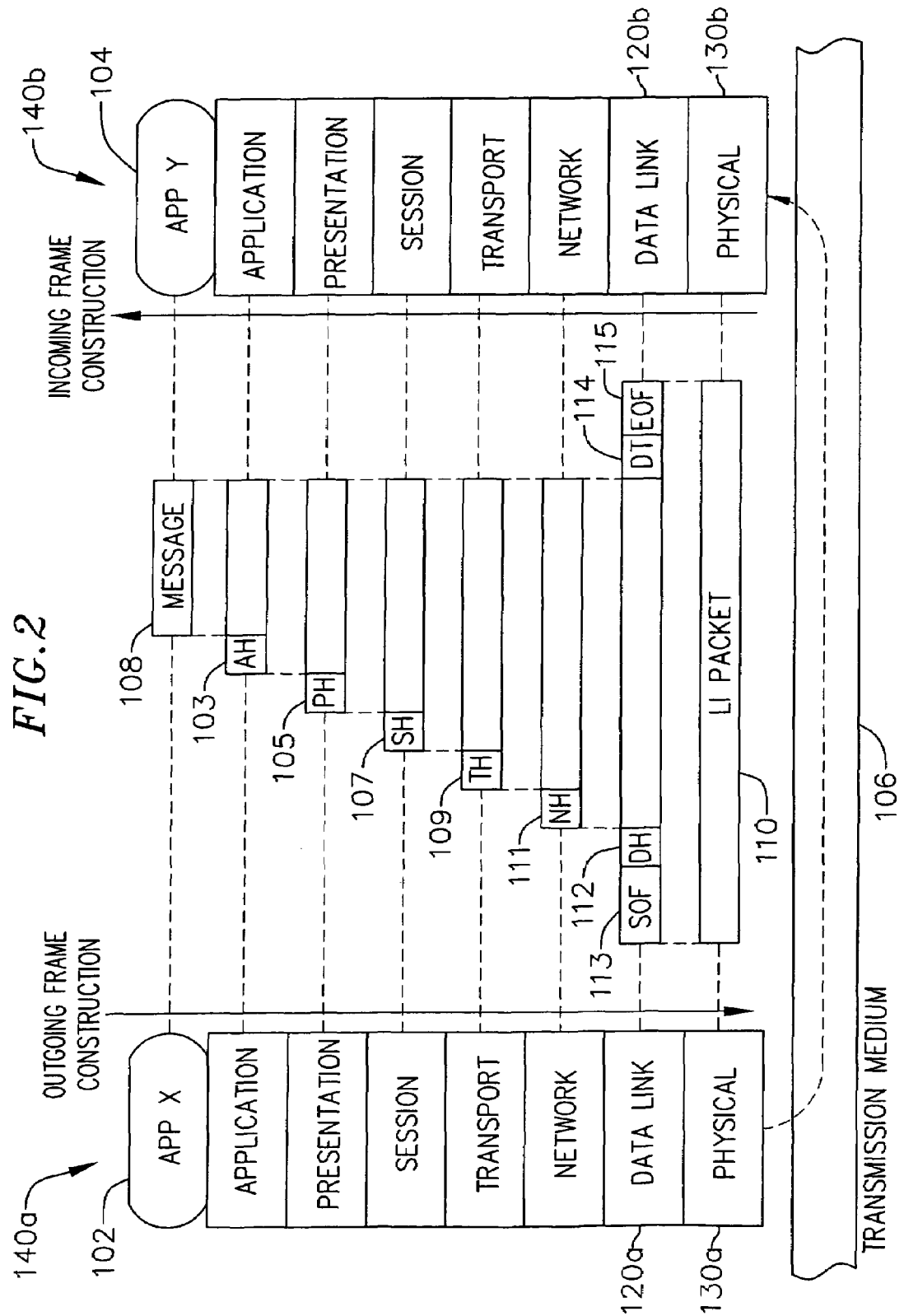

| FREQUENCY(MHz) | PSD LIMIT(dBm/Hz) |
|---|---|
| $0.015 < f <= 1.7$ | $-140$ |
| $1.7 < f <= 3.5$ | $-140 + (f-1.7)*50.0/1.8$ |
| $3.5 < f <= 4.0$ | $-90 + (f-3.5)*17.0$ |
| $4.0 < f < 7.0$ | $-71.5$ |
| $7.0 <= f <= 7.3$ | $-81.5$ |
| $7.3 < f < 10.0$ | $-71.5$ |
| $10.0 <= f < 13.0$ | $-81.5 - (f-10.0)*43.5/3.0$ |
| $13.0 <= f < 25.0$ | $-125$ |
| $25.0 <= f < 30.0$ | $-140$ |

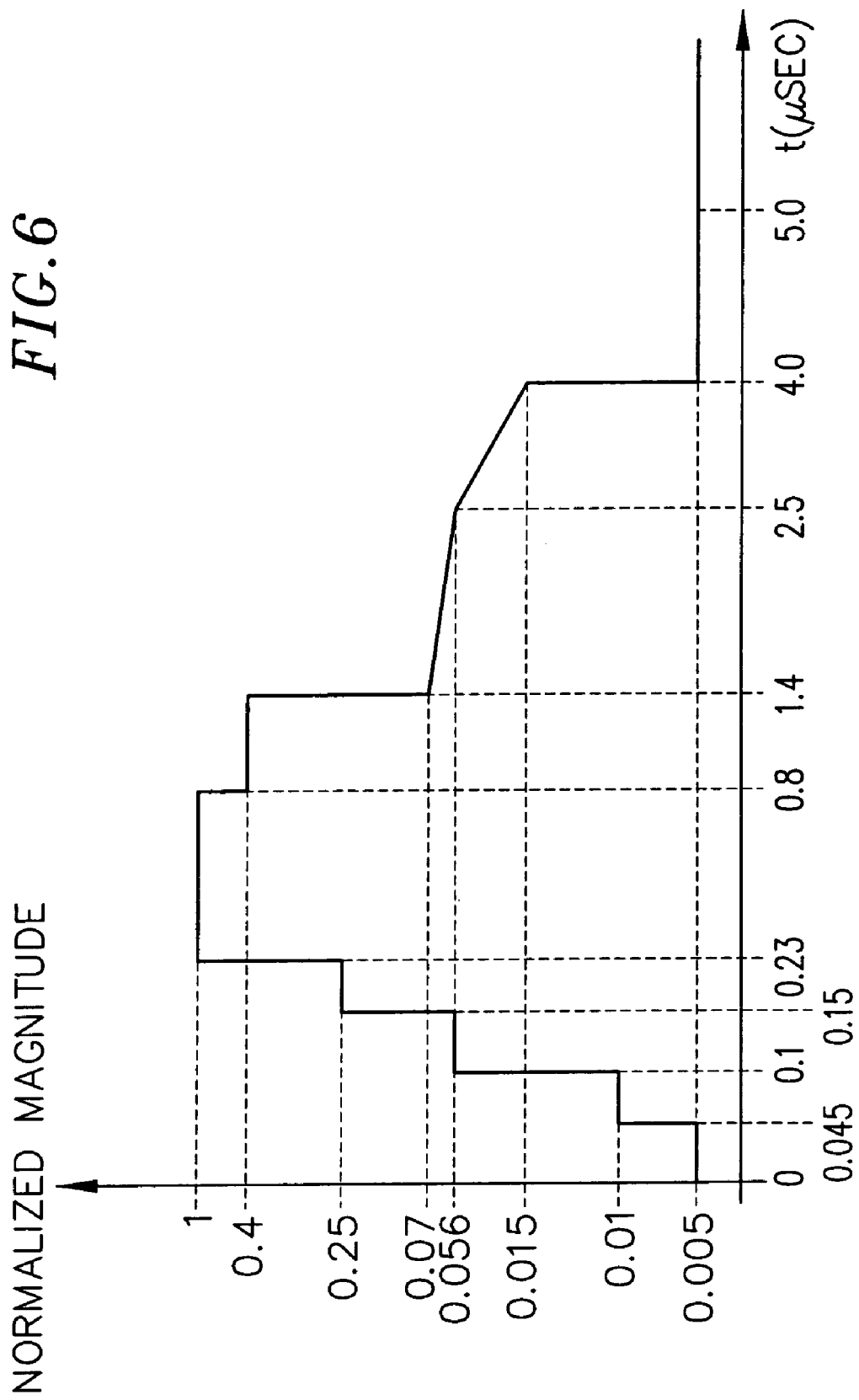

FIG. 7

| FREQUENCY RANGE(MHz) | MAXIMUM PEAK-TO-PEAK INTERFERER LEVEL(VOLTS) |
| --- | --- |
| 0.01−0.1 | 6.0 |
| 0.1−0.6 | 3.3 |
| 0.6−1.7 | 1.0 |
| 1.7−4.0 | 0.1 |
| 7.0−7.3 | 0.1 |
| 10.0−10.15 | 0.1 |
| 14.0−14.35 | 0.28 |
| 18.068−18.168 | 0.5 |
| 21.0−21.45 | 0.5 |
| 24.89−24.99 | 0.5 |
| 28.0−29.7 | 0.5 |

FIG. 8

| FREQUENCY RANGE(MHz) | MAXIMUM PEAK-TO-PEAK INTERFERER LEVEL(VOLTS) |
| --- | --- |
| 0.01−0.1 | 20.0 |
| 0.1−0.6 | 20.0 |
| 0.6−1.7 | 10.0 |
| 1.7−4.0 | 2.5 |
| 7.0−7.3 | 2.5 |
| 10.0−10.15 | 2.5 |
| 14.0−14.35 | 5.0 |
| 18.068−18.168 | 5.0 |
| 21.0−21.45 | 5.0 |
| 24.89−24.99 | 5.0 |
| 28.0−29.7 | 5.0 |

FIG. 9

| FREQUENCY RANGE(kHz) | MIN.IMPEDANCE(OHMS) |
|---|---|
| 0<f<=0.285 | 1 M |
| 0.285<f<=2.85 | 100 k |
| 2.85<f<=28.5 | 10 k |
| 28.5<f<=95 | 4.0 k |
| 95<f<=190 | 2.0 k |
| 190<f<=285 | 1.4 k |
| 285<f<=380 | 1.0 k |
| 380<f<=475 | 850 |
| 475<f<=570 | 700 |
| 570<f<=665 | 600 |
| 665<f<=760 | 525 |
| 760<f<=855 | 450 |
| 855<f<=950 | 400 |
| 950<f<=1000 | 350 |
| 1000<f<=1400 | 175 |
| 1400<f<=2300 | 100 |
| 2300<f<=2850 | 50 |
| 2850<f<=3085 | 25 |
| 3085<f<=3725 | 10 |
| 3725<f<=3935 | 25 |
| 3935<f<=4000 | 50 |
| 10000<f<=10450 | 40 |
| 10450<f<=10925 | 25 |
| 10925<f<=13125 | 10 |
| 13125<f<=14175 | 25 |
| 14175<f<=16800 | 50 |
| 16800<f<=21000 | 100 |
| 21000<f<=30000 | 50 |

METHOD AND APPARATUS FOR TRANSCEIVER NOISE REDUCTION IN A FRAME-BASED COMMUNICATIONS NETWORK

CROSS-REFERENCE TO RELATED APPLICATION(S)

This patent application claims the benefit of the filing date of U.S. Provisional Patent Application No. 60/197,224 filed Apr. 14, 2000; and U.S. Provisional Patent Application No. 60/196,002 filed Apr. 7, 2000; the entire contents of both of which are hereby expressly incorporated by reference.

This patent application is further related to the following U.S. Patent Applications filed concurrently herewith and commonly assigned, entitled "A Method of Sharing Information among a Plurality of Stations in a Frame-based Communications Network", application Ser. No. 09/825,708, "A Method of Enhancing Network Transmission on a Priority-enabled Frame-based Communications Network", application Ser. No. 09/825,897, "A Method of Determining a Start of a Transmitted Frame in a Frame-based Communications Network", application Ser. No. 09/825,903, "A Method of Determining an End of a Transmitted Frame in a Frame-based Communications Network", application Ser. No. 09/825,775, "A Method for Providing Dynamic Adjustment of Frame Encoding Parameters in a Frame-based Communications Network", application Ser. No. 09/826,218, "A Method for Selecting Frame Encoding Parameters in a Frame-based Communications Network", application Ser. No. 09/826,435, "A Method for Selecting Frame Encoding Parameters to Improve Transmission Performance in a Frame-based Communications Network", application Ser. No. 09/825,756, "A Method of Determining a Collision Between a Plurality of Transmitting Stations in a Frame-based Communications Network", application Ser. No. 09/825,801, "A Method of Providing Synchronous Transport of Packets Between Asynchronous Network Nodes in a Frame-based Communications Network", application Ser. No. 09/825,851, "A Method of Controlling Data Sampling Clocking of Asynchronous Network Nodes in a Frame-based Communications Network", application Ser. No. 09/826,067, "A Method for Distributing Sets of Collision Resolution Parameters in a Frame-based Communications Network", application Ser. No. 09/825,689, "A Method and Apparatus for Transceiver Noise Reduction in a Frame-based Communications Network", application Ser. No. 09/825,638, "A Method for Selecting an Operating Mode for a Frame-based Communications Network", application Ser. No. 09/825,791, and "A Transceiver Method and Signal Therefore Embodied in a Carrier Wave for a Frame-based Communications Network", application Ser. No. 09/826,239.

BACKGROUND OF THE INVENTION

The present invention relates to the field of communications, and, in particular, to a frame-based communications network.

As computers become more and more cost effective for the everyday consumer and for small businesses, such computers become more plentiful for use within local area environments such as homes, office buildings and the like. For example, within a home a person with a computer in the bedroom, and another in the living room, may want to share common files, utilize a common digital subscriber line (DSL), or otherwise transfer information between the computers. Accordingly, various technologies are being developed for computer interconnection of multiple computers located within such environments. One example of such technologies are the Home Phoneline Network Alliance (HPNA) specifications for local area network (LAN) computer interconnection which utilize existing telephone lines within the local environment for the transmission of data packets between the computers.

FIG. 1a shows in block diagram form a general home networking environment within which the present invention can be implemented. Home network 10 includes existing (installed) plain old telephone service (POTS) wiring 12, network clients 14, the computer port side of modem 16 and fax 18. POTS wiring 12 provides wiring infrastructure used to network multiple clients at a customer premises (e.g., home) 20. POTS wiring 12 can be conventional unshielded twisted pair (UTP) wiring that is generally routed internally in the walls of the customer premises 20 to various locations (e.g., rooms) within the customer premises. Subscriber loop 22 (also called a "local loop") is a physical wiring link that directly connects an individual customer premises 20 to the Central Office through telephone network interface 24, a demarcation point between the inside and outside of customer premises 20. Of particular importance for residential networks are systems that provide communication between computers as reliably and with as high a data rate as possible. Communication over residential telephone wiring is provided through inventive frame-oriented link, media access and physical layer protocols and implementation techniques associated therewith described herein.

Referring now to FIG. 1b, those skilled in the art can appreciate that home phone-line network configuration 10 can also utilize interface 6010 to provide signals outside customer premises 20. For example, interface 6010 can include a V.90 modem as described above, connected through the central office to an internet service provider. Interface 6010 can include an ADSL modem, a VDSL modem or the like transport interface.

Another desired solution for high speed data communications appears to be cable modem systems. Cable modems are capable of providing data rates as high as 56 Mbps, and are thus suitable for high speed file transfer. In a cable modem system, a headend or cable modem termination system (CMTS) is typically located at a cable company facility and functions as a modem which services a large number subscribers. Each subscriber has a cable modem (CM). Thus, the CMTS facilitates bidirectional communication with any desired one of the plurality of CMs. Referring to FIG. 1c, a hybrid fiber coaxial (HFC) network 1010 facilitates the transmission of data between a headend 1012, which includes at least one CMTS, and a plurality of homes 1014, each of which contains a CM. Such HFC networks are commonly utilized by cable providers to provide Internet access, cable television, pay-per-view and the like to subscribers. Approximately 500 homes 1014 are in electrical communication with each node 1016, 1034 of the HFC network 1010, typically via coaxial cable 1029, 1030, 1031. Amplifiers 1015 facilitate the electrical connection of the more distant homes 1014 to the nodes 1016, 1034 by boosting the electrical signals so as to desirably enhance the signal-to-noise ratio of such communications and by then transmitting the electrical signals over coaxial conductors 1030, 1031. Coaxial conductors 1029 electrically interconnect the homes 1014 with the coaxial conductors 1030, 1031, which extend between amplifiers 1015 and nodes 1016, 1034. Each node 1016, 1034 is electrically connected to a hub 1022, 1024, typically via an optical fiber 1028, 1032. The hubs 1022, 1024 are in communication with the headend 1012, via optical fiber 1020, 1026. Each hub is typically capable of facilitating communication with approximately 20,000 homes 1014. The optical fiber 1020, 1026 extends the headend 1012 and, along with hubs 1022, 1024 defines a fiber ring which is typically capable of facilitating communication between approximately 100,000 homes 1014 and the headend 1012. The headend 1012 may include video servers, satellite receivers, video modulators, telephone switches and/or Internet routers 1018, as well as the CMTS. The headend 1012 communicates via transmission line 1013, which may be a T1 or T2 line, with the Internet, other headends and/or any other desired device(s) or network(s).

Given the HPNA environment and the Cable Modem System environment, an opportunity exists for a system provider to integrate each respective environment with voice services. FIG. 1d depicts such an integrated environment. As can be seen in FIG. 1d, a connection point in the home to the telephony world (e.g., the world of video, voice, high speed data network traffic), could be provided to a home user through cable modem 1046 which would include an HPNA transceiver. The cable modem system provider may also wish to accommodated providing telephone service along with high speed data service. A home computer user, rather than using a traditional modem to connect to an internet service provider, would find it convenient to utilize cable modem 1046, taking advantage of the very high speed data service provided by the cable modem. Having a cable modem customer, the cable modem provider may also find it commercially beneficial to offer video feeds, and telephone service over the same cable modem network.

A cable modem having an HPNA V2 transceiver included therein, can readily interface into the home phone line network through the telephone jack within the home. Computers coupled to the home network then communicate through the cable modem to the outside telephony world as described above. Telephone service coming from outside the customer premises over the cable modem system would be in a digitized packetized format. It would then proceed over the HPNA network in the same digitized packeting format. If the user, in addition to having computers and the like attached to the HPNA network, wished to have an analog telephone(s) connected to the HPNA, the telephone' (s) analog signal would go through a digital conversion and put the digital information into packets for passing the packets back and forth over the network. The analog telephone signal is sampled and packetized at the appropriate clock rate creating the packet after a certain number of samples.

Therefore, to effectively operate in such communications network environments a need exists for a method and apparatus for transceiver noise reduction in a frame-based communications network. The present invention as described and claimed in this application provides a solution to meet such need.

SUMMARY OF THE INVENTION

In accordance with the present invention a method of and apparatus for noise reduction for a transceiver transmitting frames over a transmission medium in a frame-based communications network is set forth. A transceiver transmit path and a transceiver receive path is provided. A blocking switch is located in the transceiver transmit path, the blocking switch allowing transmit signal propagation when enabled, while preventing both transmit signal propagation and circuit device noise coupling from the transceiver transmit path to the transceiver receive path when the blocking switch is disabled. The blocking switch is disabled when the transceiver transmit path is not transmitting frames over the frame-based communications network.

BRIEF DESCRIPTION OF THE DRAWINGS

FIG. 2 is a seven-layer network stack model, according to the ISO seven-layer network standard, as used in accordance with the present invention.

FIG. 6 shows the magnitude of the transmitter output in accordance with the present invention.

FIGS. 7 and 8 depict maximum peak-to-peak interferer level over frequency range in accordance with the present invention.

FIG. 9 shows minimum impedance over frequency range.

DETAILED DESCRIPTION OF THE INVENTION

Figure 1A:
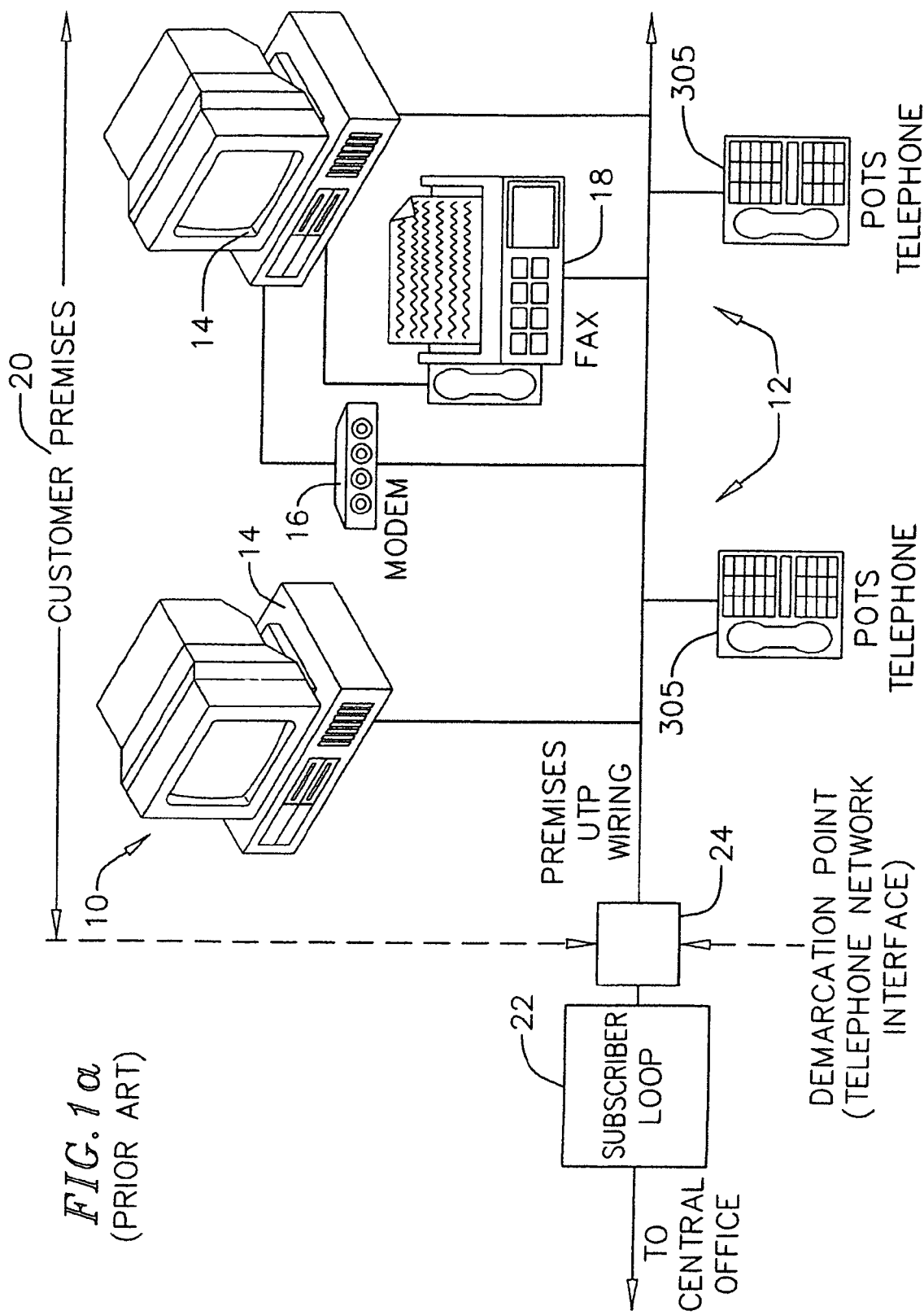
FIGS. 1a, 1b, 1c and 1d are simplified block diagrams showing a home networking environment within which the present invention can be implemented.

A communications network typically includes a group of nodes interconnected by a transmission medium. The term "node" relates to any device that shares frames of data with other nodes in the network. Devices that may make up a node are computers, printers, scanners, etc. A node may also be a telephone, a television, a set-top box for televisions, a camera or other electronic sensing or communication device. Any device that can send and/or receive frames of data with other devices via a communication medium may be a node for purposes of the present invention.

The transmission medium that links each node in a network is equally one of a diverse family of media. Common media used include unshielded twisted pair (e.g. phone wire, CAT-5 cabling), power lines, optical fiber, coaxial cable and wireless transmission media. The operations that each individual node performs in order to access data from, and transmit data to, the rest of the network may be logically broken down into seven layers according to the ISO Open Systems Interconnection (OSI) seven-layer network model, which is also referred to as the "network stack". The seven layers, from the bottom to the top are: 1) the PHYSICAL layer, 2) the DATA LINK layer, 3) the NETWORK layer, 4) the TRANSPORT layer, 5) the SESSION layer, 6) the PRESENTATION layer, and 7) the APPLICATION layer. FIG. 2 illustrates the ISO seven-layer reference model.

The PHYSICAL layer, or physical link layer, or PHY, is concerned with transmission of unstructured bit stream traffic over physical media, and relates to the mechanical, electrical, functional, and procedural characteristics to access and receive data from the physical medium. The DATA layer, sometimes referred to as the data link layer, provides for the reliable transfer of information across the physical link. It is concerned with sending frames, or blocks of data, with the necessary synchronization, error control, and flow control. The NETWORK layer separates the uppermost layers from the transmission and switching technologies used to connect nodes. It relates to establishing, maintaining, or terminating connection between nodes.

The TRANSPORT layer relates to reliability and transparency in data transfers between nodes, and provides end-to-end error recovery and flow control. The SESSION layer provides control to communications between applications, and establishes, manages, and terminates connections between cooperating applications. The PRESENTATION layer provides independence to the application processes from differences in data syntax or protocols. Finally, the highest layer, the APPLICATION layer, provides access to the OSI environment for users. Much more has been written about the benefits and distributed functionality of such an arrangement of layers and need not be recounted here.

In frame-based networks, there are two fundamental models or topologies: 1) broadcast/multipoint networks, where all nodes are physically attached to the same network medium, and use a single, shared channel and frames transmitted on the network are visible to all nodes; and 2) point-to-point networks, where pairs of nodes are connected to each other with communication channels which are not connected to any other nodes on the network. Frames transmitted on one channel are not visible to nodes on other channels unless the frames are retransmitted onto the other channels by a node that is connected to multiple channels. Each channel may use a separate segment of the network medium, or multiple channels may share a single segment using e.g., Frequency Division Multiplexing or Time Division Multiplexing techniques. One common example of such a point-to-point network topology is that used for IEEE 10BaseT 802.3 networks, with network nodes connected via point-to-point Category 5 unshielded twisted pair cable, using multi-port devices called hubs to retransmit frames received from one network segment to all other segments.

Figure 3A:
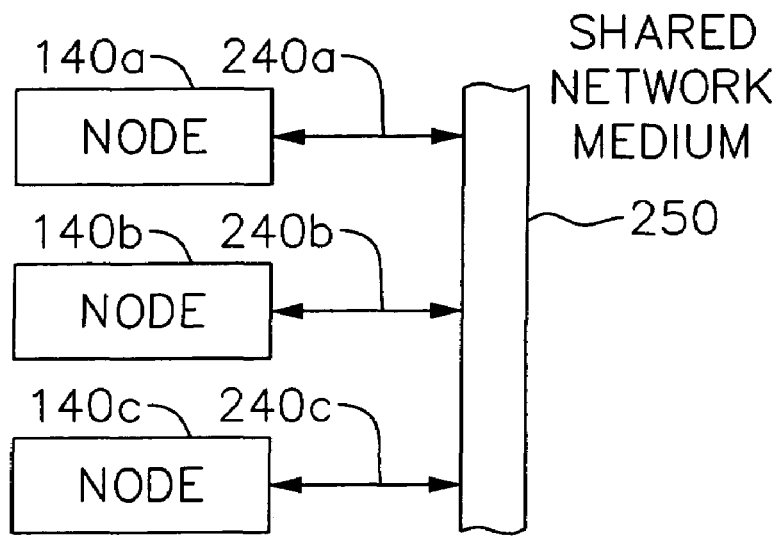
FIGS. 3a and 3b show a broadcast/multipoint network and a point-to-point network, respectively, for use in accordance with the present invention.
Figure 3B:
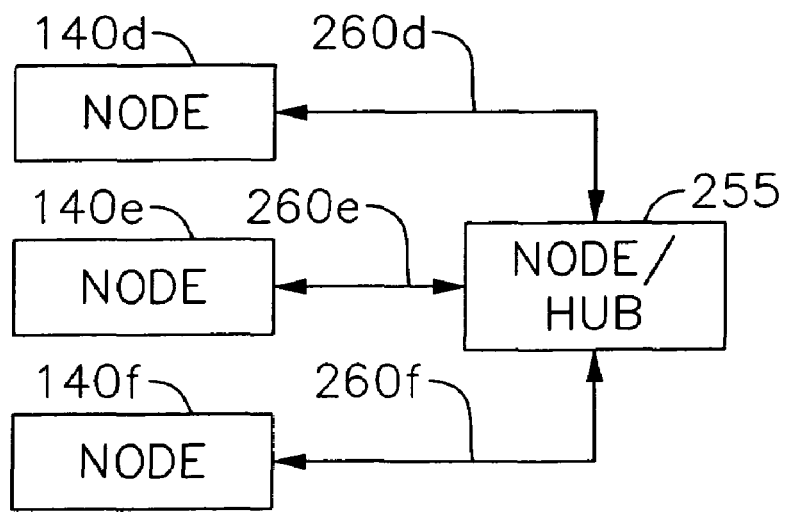

FIGS. 3a and 3b show a broadcast/multipoint network and a point-to-point network, respectively, for use with the present invention. In FIG. 3a, representative nodes 140a, 140b, 140c are communicatively coupled with a common transmission medium 250 through individual segments 240a, 240b, 240c respectively. Thus, a message containing a broadcast destination address sent from one node is sent to all other nodes coupled with transmission medium 250. In FIG. 3b, nodes 140d, 140e, 140f are communicatively coupled to each other by individual segments 260d, 260e, 260f respectively of transmission media and hub 255. Messages sent from one node to another node on one segment are not visible to nodes on other segments unless they are retransmitted by a node that is connected to multiple segments, such as hub 255 in a network. Segments 240a, 240b, 240c and common transmission medium 250 may be (but are not restricted to) a phone line, a power line, a wireless medium, coaxial cable, or a fiber optic medium. Reference to FIGS. 3a and 3b should be made with respect to the description of the embodiments of the invention as set forth below.

Each node in either type of network has within it a device that permits the node to send and receive data frames in the form of electrical, electromagnetic, or optical signals. The device is conventionally a semiconductor device implementing the PHYSICAL layer of the network connectivity, and the medium access control (MAC) portion of the DATA layer of network connectivity.

Returning to FIG. 2, there is shown a basic network illustrating a network communication protocol between first node 102 that runs an application ("APP X") and another node 104 that runs the same or different application ("APP Y"). Nodes 102 and 104 communicate message 108 via transmission medium 106. In the example shown in FIG. 2, when node 102 has message 108 to send to node 104, it transfers the message down through its network stack on the left, from layer to layer. Application header (AH) 103 is appended to message 108 in the APPLICATION layer, to identify the application being executed by node 102. Original message 108, plus the application header AH, is passed to the PRESENTATION layer, where it is again appended with a presentation layer header (PH) 105. Such process continues, accordingly adding session header (SH) 107, transport header (TH) 109 and network header (NH) 111 down to the DATA layer, where the message and appended headers is encapsulated with data layer header (DH) 112 and start of frame (SOF) indicator 113. The DATA layer also may add data trailer (DT)114 and end of frame (EOF) indicator 115. Data layer header 112 may include a source address (SA) to identify node 102 sending the message, and may also include a destination address (DA) to identify the intended recipient or group of recipients.

The message with appended headers, trailers and indicators is then passed to the PHYSICAL layer where it is passed on to network transmission medium 106. When received by node 104, the reverse process occurs in the network stack of node 104. At each layer, the header and/or trailer information is stripped off as message 108 ascends the network stack.

The details of the network stack in FIG. 2 are provided for reference only, and the present invention is not limited to functioning with network stack implementations that exactly match FIG. 2.

Referring still to FIG. 2, the lower two layers are described in further detail. It should be understood that these layers are typically implemented as a combination of logic and memory storage that is configured to carry out the task of the layer. The logic can be in the form of hardware, software, firmware, or a combination of those. Each layer may also be implemented using programmable gate array (PGA) technology, such as system programmable gate arrays (SPGA) and field programmable gate arrays (FPGA). Also, each layer, or a combination of the layers, may be implemented as an integrated circuit or software program. Therefore, it should be apparent to those skilled in the art, that there are many ways in which to implement the inventions described herein.

FIG. 2 shows DATA layers 120a, 120b and PHYSICAL layers 130a, 130b for a representative pair of nodes 140a, 140b according to the invention. Each node has within it semiconductor device(s) that implement the PHYSICAL layer as well as the medium access control (MAC) and Link Layer portions of the DATA layer, such as that implemented by the Broadcom Corporation Model BCM 4210 Controller. As discussed above, the PHYSICAL layer is concerned with transmission and reception of bit stream traffic to and from the transmission medium. Transmitters and receivers, described in more detail below, form a transmission medium interface, and may be implemented as a single device or separate devices.

Figure 4A:
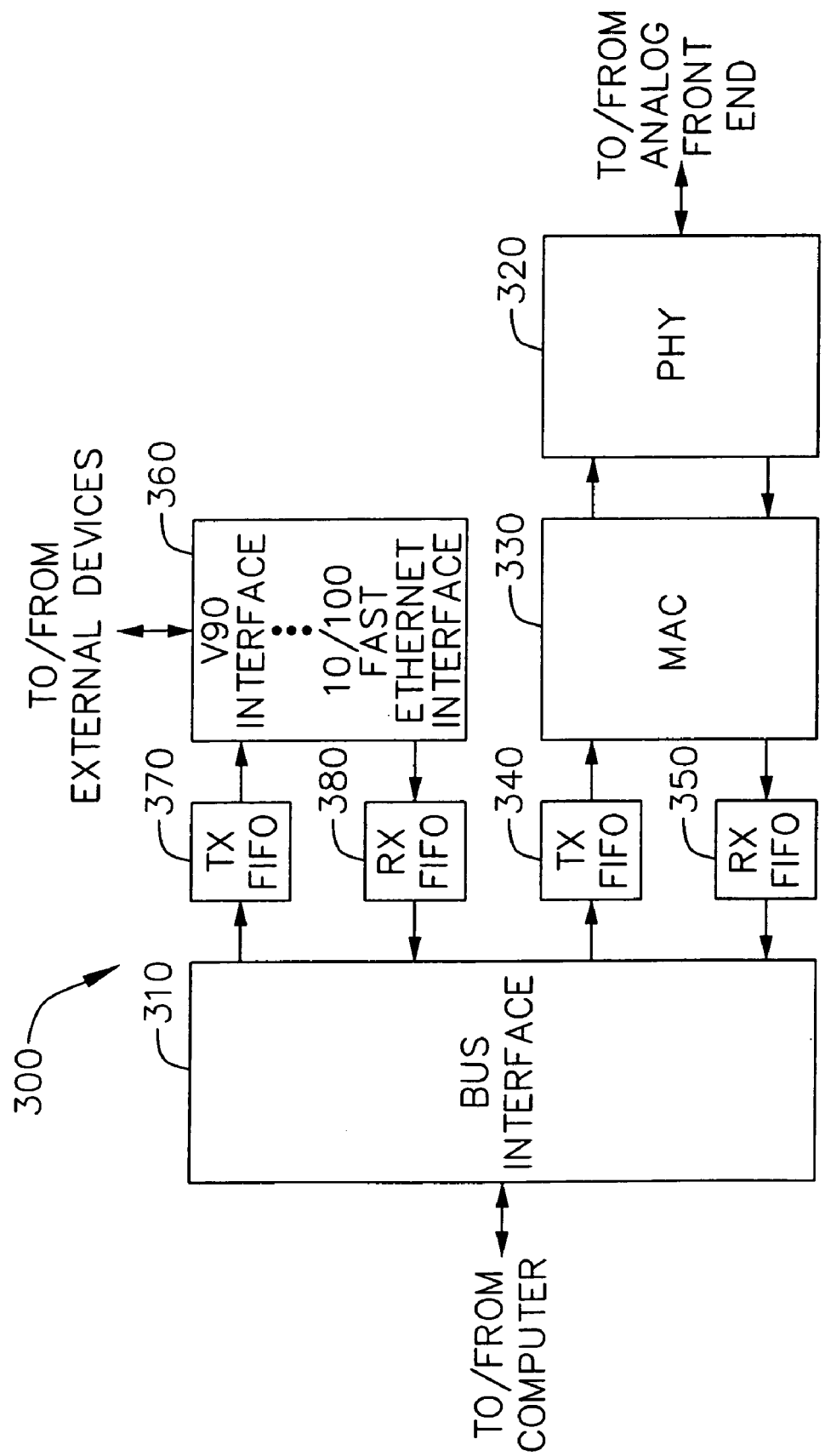
FIGS. 4a and 4b show respectively an integrated MAC/PHY aspect and an analog front end aspect of an embodiment of the present invention.
Figure 4B:
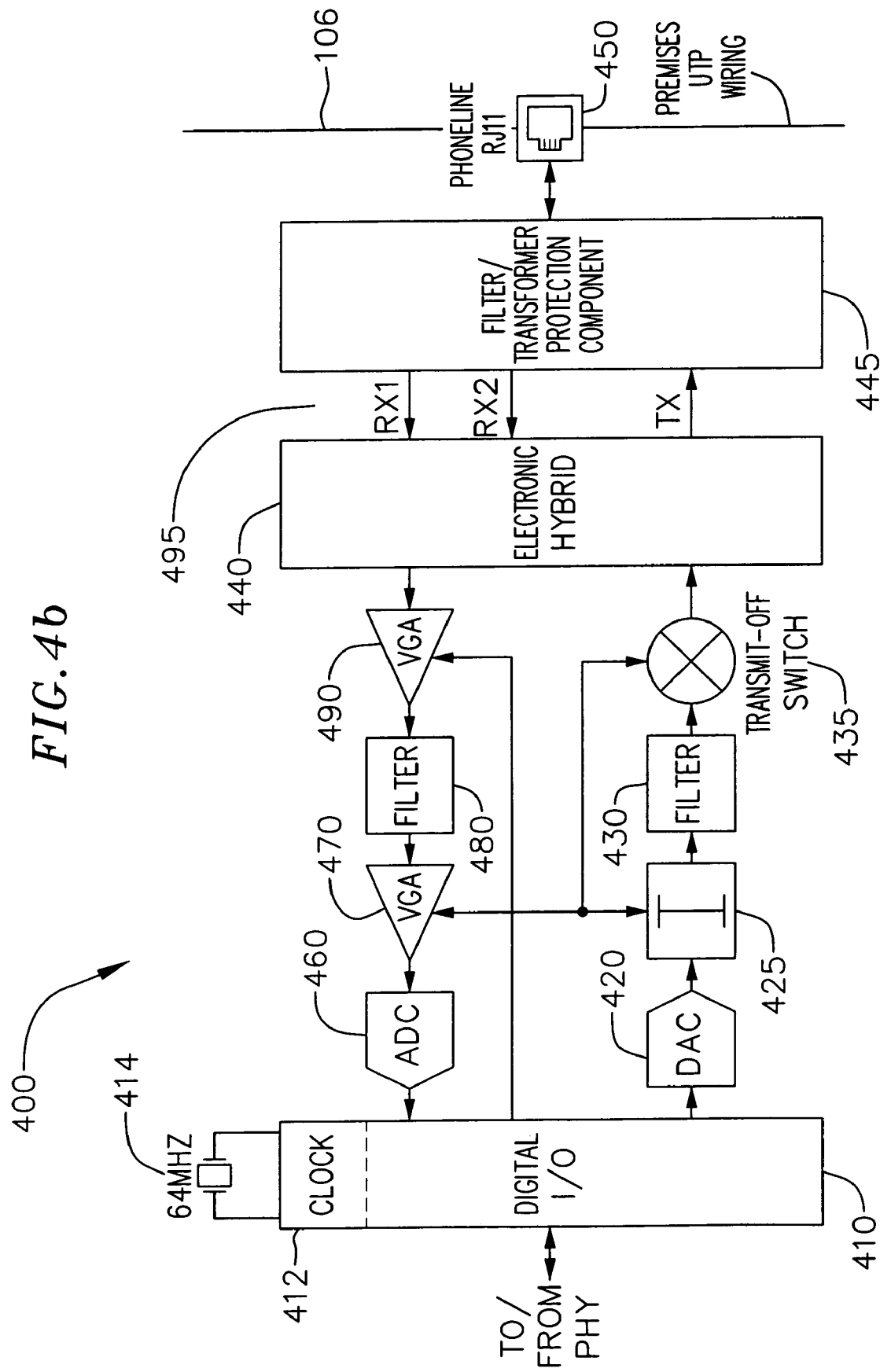

Referring now to FIGS. 4a and 4b, an embodiment implementing the inventive concepts is depicted wherein, for example, a device such as computer 14 can be interconnected therethrough to premises UTP wiring as set forth in FIG. 1a, and through which the protocol set forth in FIG. 2 is processed. FIG. 4a shows in block diagram form the controller aspects of the embodiment, while FIG. 4b shows typical network interface device (NID) analog front end aspects of the embodiment.

Referring to FIG. 4a, controller 300 is a fully integrated MAC/PHY device that transmits and receives data (e.g., 10 Mbps and above as implemented by the aforementioned Broadcom Corporation Model BCM 4210 controller or, alternatively Broadcom Corporation Model BCM 4211 and BCM 4413 controllers). Controller 300 includes bus interface 310, such as a PCI or MSI bus interface for communication in accordance with well-known PC-based and/or peripheral/internet appliance architectures. Controller 300 also includes digital PHY 320 having a FDQAM/QAM transmitter and receiver interfacing with the analog front end and MAC 330, coupling to bus interface 310 through transmit (TX) FIFO 340 and receive (RX) FIFO 350. Bus interface 310 also has the capability of similarly communicating with other devices 360, such as a v.90 modem through a v.90 modem interface or a 10/100 Fast Ethernet bus through a 10/100 Fast Ethernet interface (collectively 360), and their respective transmit (TX) FIFO 370 and receive (RX) FIFO 380. The operations of such bus interfaces and TX/RX FIFOs are well known in the art and are not described in more detail. The operation of the MAC/PHY aspects of the embodiment are described in more detail herein below.

Figure 1B:
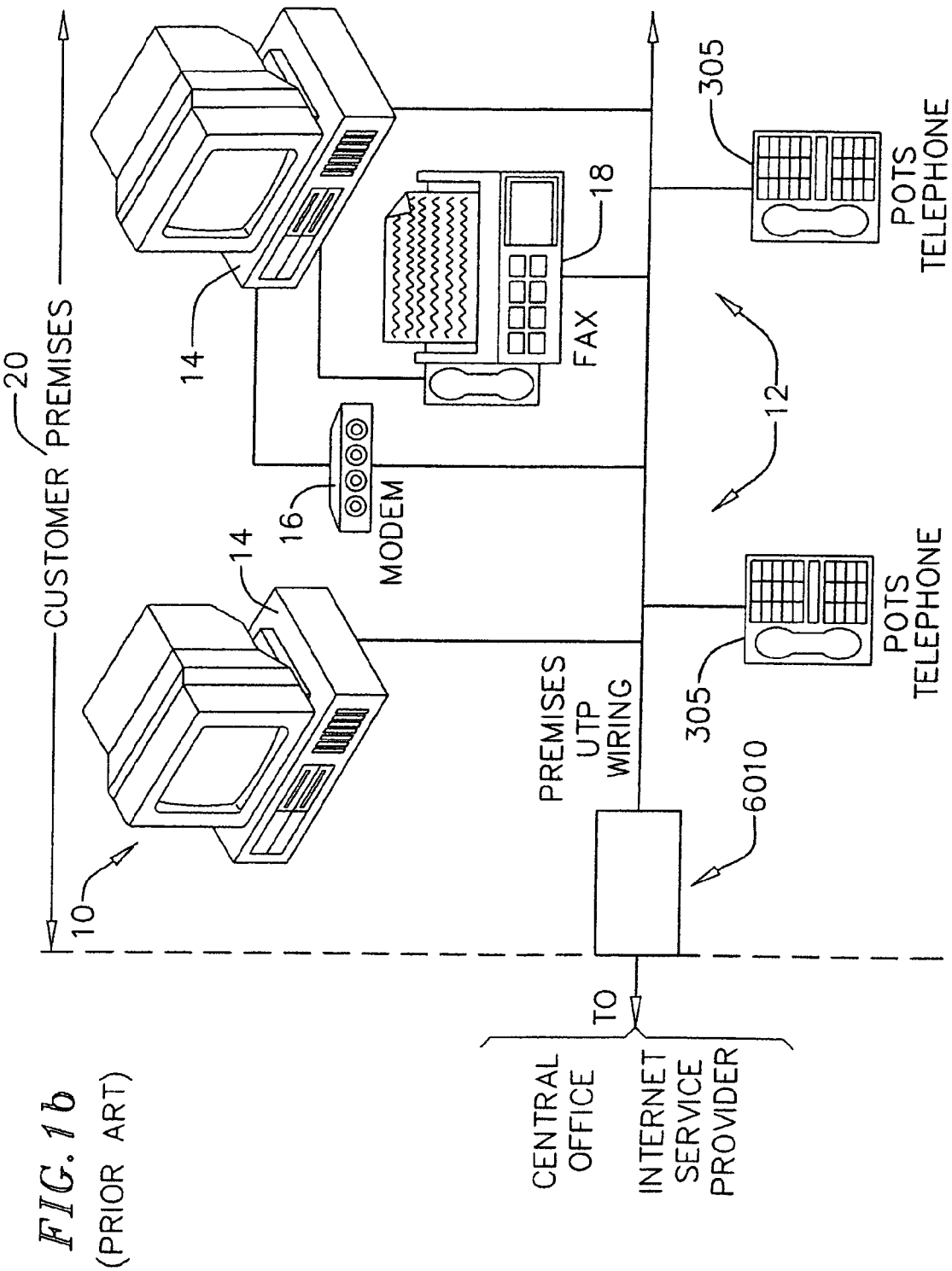
Figure 1C:
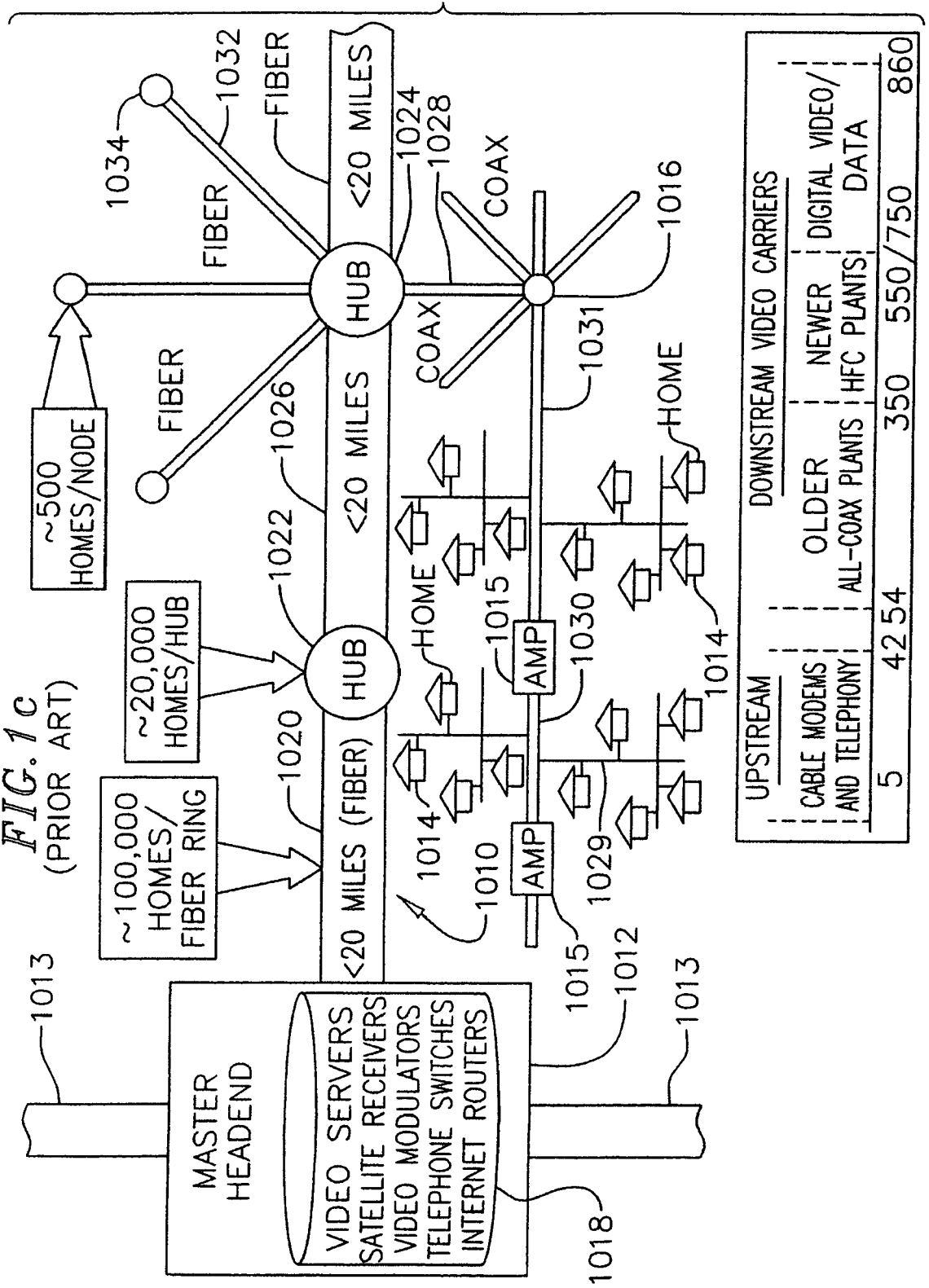
Figure 1D:
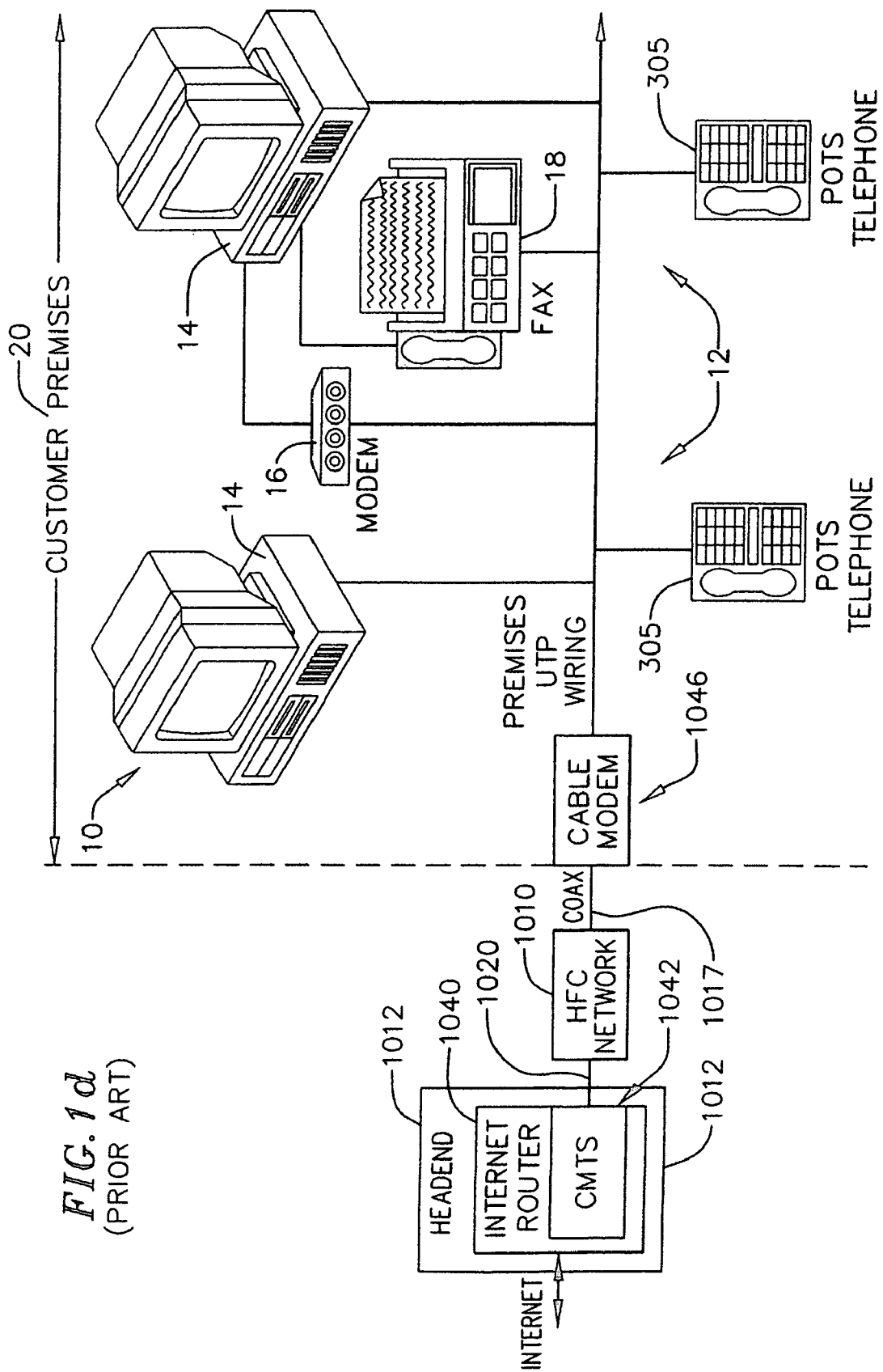

Referring to FIG. 4b, NID analog front end 400 connects controller 300 depicted in FIG. 4a to a transmission medium 106 such as a premises UTP wiring as depicted in FIGS. 1a, 1b and 1c. Analog front end 400 includes digital input/output (I/O) circuit 410 for transferring samples and is coupled to a transmit path and a receive path. Digital I/O 410 includes clock 412 for driving controller 300 with a 64 MHz +/−100 ppm clock generated by 64 Mhz crystal 414. The transmit path includes digital-to-analog converter 420 for converting 10 bit sample data to an analog signal, automatic gain controller 425 for setting gains based upon input received by digital I/O 410, filter 430, transmit-off switch 435, and is coupled to phoneline connector 450, such as a UTP wiring RJ11 connector, through electronic hybrid 440 for buffering signals and filter/transformer/electronic protection circuit 445. The receive path includes analog-to-digital converter 460 for sending valid sample data, variable gain amplifier (VGA) 470, filter 480 for low-pass anti-aliasing, VGA 490, and is similarly coupled to phoneline connector 450 through electronic hybrid 440 and filter/transformer/electronic protection circuit 445. Electronic hybrid 440 and filter/transformer/electronic protection circuit 445 are connected therebetween by a plurality of transmit and receive lines (e.g., TX, RX1, RX2) 495. The operations of the analog front end are well known in the art.

Figures 5A, 5B:
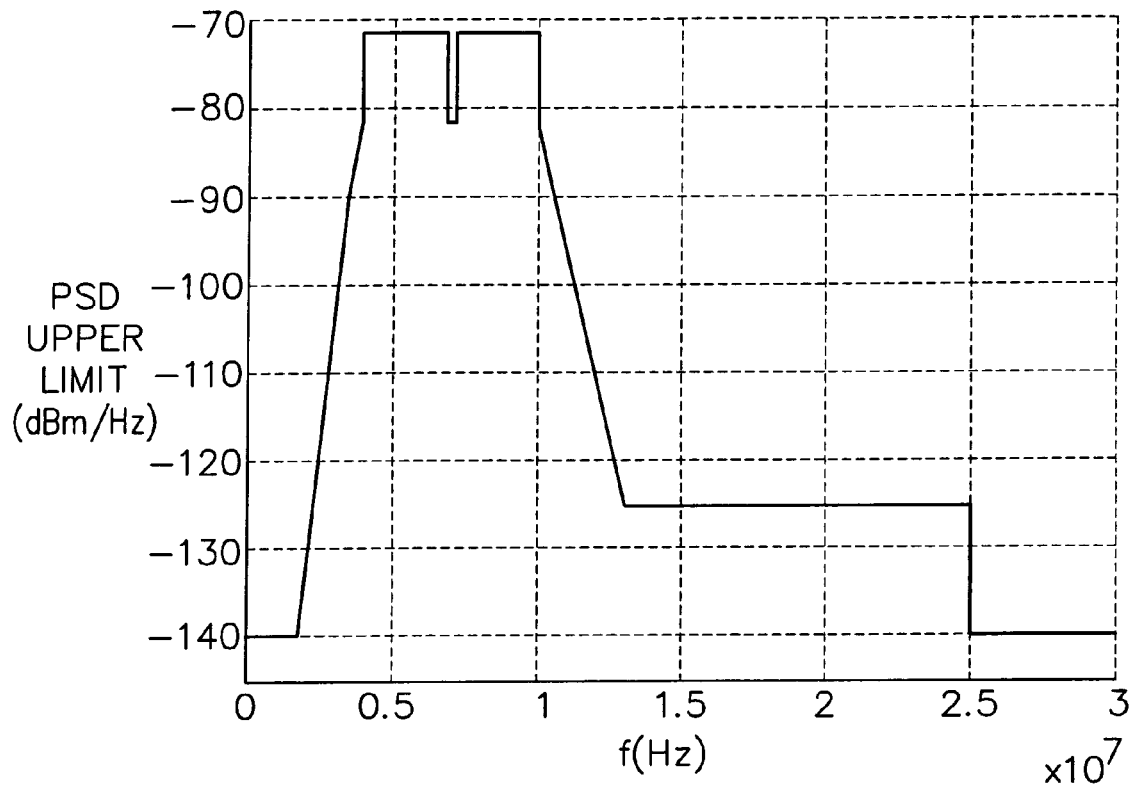
FIGS. 5a and 5b depict the metallic power spectral density associated with the transmitter in accordance with the present invention.

Now turning to transmitter electrical characteristics, stations at a minimum are capable of transmitting and receiving 2 MBaud modulated frames in native V2 frame format. In a preferred embodiment stations are capable of transmitting and receiving 2 Mbaud Compatibility V2 frame format. Stations at a minimum are capable of transmitting all constellations from 2 bits-per-Baud to 8 bits-per Baud (PE values 1–7) and receiving all constellations from 2 bits per Baud to 6 bits per Baud (PE values 1–5). The R.M.S. differential transmit voltage does not exceed −15 dBVrms in any 2-msec window between 0 and 30 MHz, measured across a 135-Ohm load between tip and ring for any payload encoding. The peak differential transmit voltage does not exceed 580 mV$_{peak}$ for any payload encoding at either 2 MBaud or 4 MBaud. Stations that are not transmitting emit less than −65 dBV$_{rms}$ measured across a 100-Ohm load between tip and ring. The electrical characteristics described below as to spectral mask apply to both the V2 native mode and the V2 compatibility mode. The V2 metallic power spectral density (PSD) is constrained by the upper bound depicted in the FIGS. 5a and 5b with the measurement made across a 100-Ohm load across tip and ring at the transmitter wire interface. The mask applies to all payload encodings at both 2 and 4 Mbaud. The resolution bandwidth used to make this measurement is 10 kHz for frequencies between 2.0 and 30.0 MHz and 3 kHz for frequencies between 0.015 and 2.0 MHz. An averaging window of 213 seconds is used, and 1500-octet MTUs separated by an IFG duration of silence is assumed. A total of 50 kHz of possibly non-contiguous bands may exceed the limit line under 2.0 MHz, with no sub-band greater than 20 dB above the limit line. A total of 100 kHz of possibly non-contiguous bands may exceed the limit line between 13.0 and 30.0 MHz, with no sub-band greater than 20 dB above the limit line. The 10 dB notches at 4.0, 7.0 and 10.0 MHz are designed to reduce RFI egress in the radio amateur bands. The mask is tested at PE values of 1 and 2 (2 and 3 bits/symbol), as these payload encodings result in the maximum transmitted power. The absolute power accuracy is +0/−2.5 dB relative to −7 dBm, integrated from 0 to 30 MHz. The passband ripple between 4.75 and 6.25 MHz and between 8.0 and 9.25 MHz is less than 2.0 dB. The magnitude of the V2 transmitter output is upper-bounded by the temporal mask shown in FIG. 6 for a compatibility mode pulse (the symbol response of the 2.0 transmitter). The response is measured across a 100-Ohm load between tip and ring at the transmitter's WIRE interface. Output before t=0 and after t=5.0 microseconds is <0.032% of the peak amplitude. The first compatibility mode pulse in the modified AID is exactly the transmitter symbol response. The transmitter C-weighted output in the band extending from 200 Hz to 3000 Hz does not exceed 10 dBrnC when terminated with a 600-Ohm resistive load. The transmitter emits no more than −55 dBVrms across a 50-Ohm load between the center tap of a balun with CMRR>60 dB and the transceiver ground in the band extending from 0.1 MHz to 50 MHz. The transmitter clock frequency is accurate to within +/−100 ppm over all operating temperatures for the device. The minimum operating temperature range for this characteristic is 0 to 70 degrees C. In general, a +/−50 ppm crystal meets this characteristic. The R.M.S. jitter of the transmitter clock is less than 70 psec, averaged over a sliding 10-microsecond window. The differential noise output does not exceed −65 dBVrms across a 100-Ohm load, measured from 4 to 10 MHz with the transmitter idle. There is no gain or phase imbalance in the transmitter, except with respect to constellation scaling as described above.

Now turning to a comparable receiver's electrical characteristics, the receiver detects frames with peak voltage up to −6 dBV across tip and ring at a frame error rate of no greater than $10^{-4}$ with additive white Gaussian noise at a PSD of less than −140 dBm/Hz, measured at the receiver. The receiver detects 1518-octet frames encoded as 2 bits/symbol and 2 Mbaud with R.M.S. voltage as low as 2.5 mV at no greater than $10^{-4}$ frame error rate. The R.M.S. voltage is computed only over time during which the transmitter is active. The receiver detects no more than 1 in $10^4$ 1518-octet, 2 bits/symbol, 2 Msymbol/sec frames with R.M.S voltage less than 1.0 mV. Both criteria assume additive white Gaussian noise at a PSD of less than −140 dBm/Hz, measured at the receiver, and assume a flat channel. The receiver demodulates frames with payload encoded at 6 bits/symbol, 2 or 4 Mbaud (if implemented), and differential R.M.S voltage as low as 20 mV (measured over the header) at a frame error rate less than $10^{-4}$ under the following conditions: (1) White Gaussian noise with PSD less than −130 dBm/Hz is added at the receiver, and (2) A single tone interferer with any of the frequency band and input voltage combinations set forth in FIG. 7. The applied voltage is measured across tip and ring at the input to the transceiver. The receiver demodulates frames with payload encoded at 6 bits/symbol, 2 or 4 Mbaud (if implemented), and differential R.M.S voltage as low as 20 mV (measured over the header) at a frame error rate less than $10^{-4}$ under the following conditions: (1) White Gaussian noise with PSD less than −130 dBm/Hz is added at the receiver, differential mode, and (2) A single-tone interferer, measured between the center tap of a test transformer and ground at the input to the transceiver, with any of the following frequency band and input voltage combinations set forth in FIG. 8. The common mode rejection of the test transformer used to insert the signal should exceed 60 dB to 100 MHz.

Figure 10:
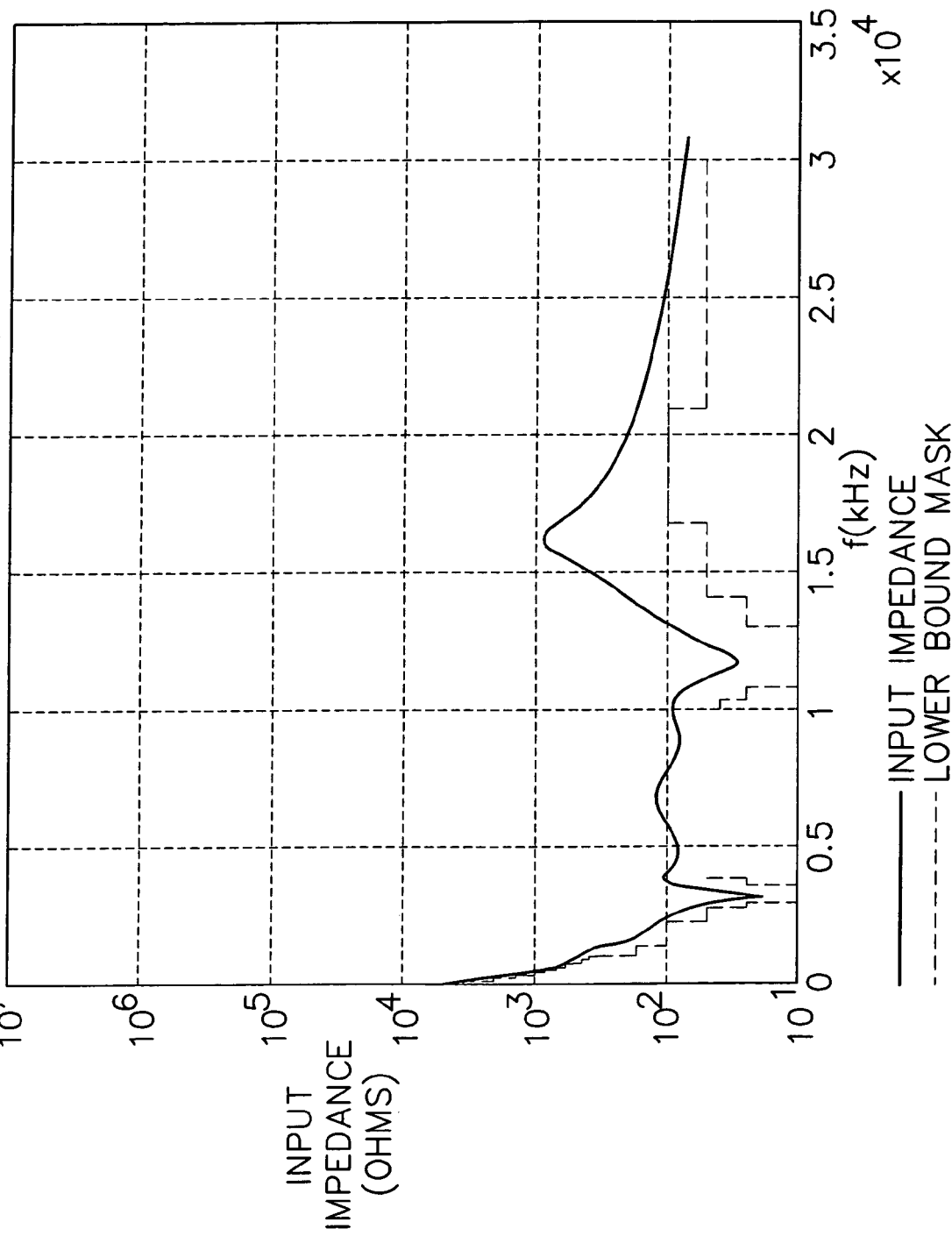
FIG. 10 shows an example of input impedance in view of a lower bound mask over frequency range in accordance with the present invention.

The average return loss of the transceiver with respect to a 100-Ohm resistive load exceeds 12 dB between 4.75 and 9.25 MHz. This characteristic applies to the transceiver powered on or in low-power mode (transmitter powered off). The average return loss with respect to a 100-Ohm resistive load exceeds 6 dB between 4.75 and 9.25 MHz with the transceiver removed from a source of power. The magnitude of the input impedance is >10 Ohms from 0–30 MHz and conforms to the lower-bound mask set forth in FIG. 9. This characteristic applies to the transceiver powered on, in low-power mode (transmitter powered off), or removed from a source of power. FIG. 10 shows an example of the input impedance of a compliant device with a lower bound mask.

Figure 11:
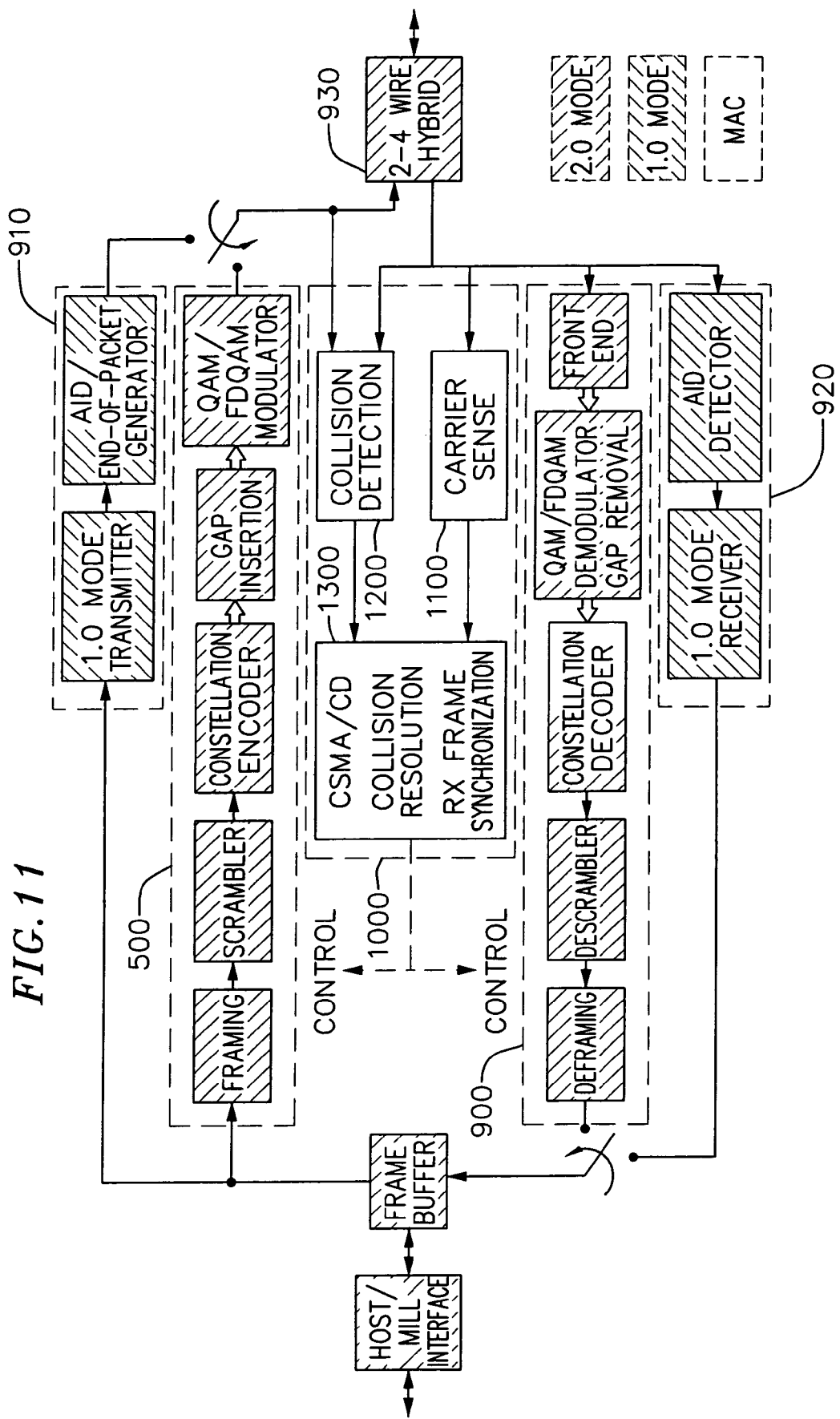
FIG. 11 shows in functional block diagram form an embodiment of a transceiver in accordance with the present invention.

With regard to the receiver aspects in accordance with the PHY layer protocol, reference is made to FIG. 11, wherein receiver functionality 900 is shown in block diagram form. Receiver functionality 900 performs the reverse of that described above for transmitter 500, namely, upon receiving a signal from 2–4 wire hybrid and performing front end processing as described in conjunction with FIG. 4*b*, the following occurs: QAM/FDQAM Demodulator Gap Removal, Constellation Decoding, De-scrambling and De-framing, as is well-known in the art given the above-defined transmitter functionality.

Figure 12:
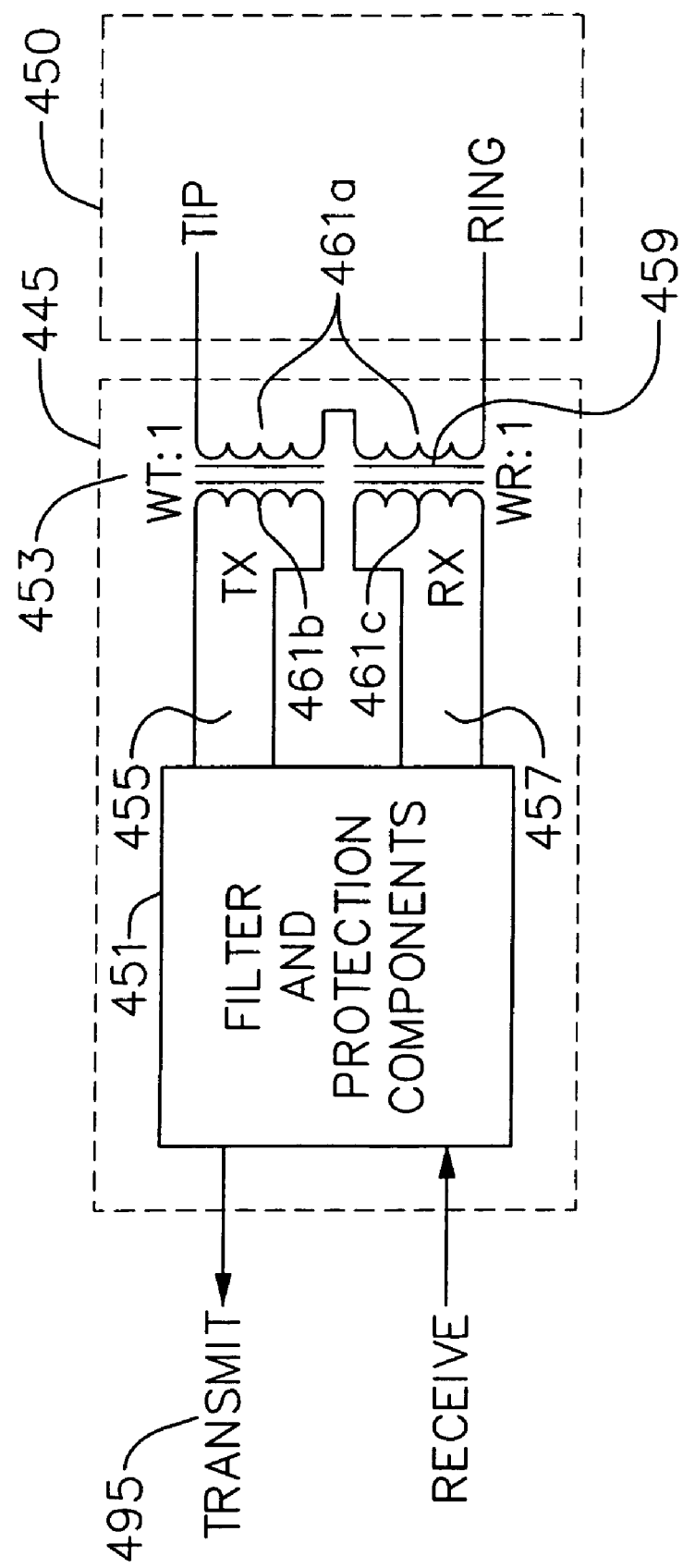
FIG. 12 depicts a split winding transformer in accordance with the present invention.

Referring back to the NID analog front end shown in FIG. 4*b* and a portion thereof shown in FIG. 12, in accordance with the present invention, a split winding transformer with turns ratios optimized for maximum transceiver signal to noise ratio is provided. More broadly, a split winding transformer useful in a modem application is provided. The transmitter output signal level for typical modems is nominally fixed within some guardband of the FCC or other regulatory agency power limit. The signal level at the receiver input, however, is highly variable depending on the channel attenuation in the path from a remote transmitter. Consequently, the ideal line isolation transformer turns ratio from the transmitter output to the line of wt:1 is not optimal for the receiver. At a modest additional cost of an additional transformer winding, the turns ratios for the transmitter and receiver can be set independently, while still allowing for hybrid echo cancellation. Since the receiver input signal will usually be less than the transmitter output signal, the optimal turns ratio is wr:1 from input to line where wr>wt. This step-up from the received signal provides a "noiseless" gain that enchances the achievable receiver S/N ratio. The maximum separation between wt and wr is limited by the reduction in coupling between transmit and receive windings that occurs for large differences. This introduces phase shift that compromises the effectiveness of common echo cancellation schemes. Practical numbers for the wr:wt ratio are from 1 to 4. Prior art voiceband ADSL modems do not take advantage of this technique. In the case of ADSL, the situation is particularly egregious in that it is common to use step up transformers from modem to line side in order to boost the transmitted signals up to levels required for long distance communication. This means there is actually attenuation of received signals. As can be seen in FIG. 12, filter/transformer/protection components 445, typically including filter/protection components 451 and transformer 453, is coupled in the Transmit and Receiver paths 495 and provides, for example, TX path 455 and RX path 457 to be coupled to TIP and RING of Phoneline RJ11 connector 450 through transformer 453. wt:1 is transmit winding ratio; wr:1 is the receive winding ratio; with the reference point, the twisted pair line, being 1. Transformer 453 couples the TIP line to the TX signal path from electronic hybrid 440 via wt:1 windings. Transformer 453 likewise couples the RING line to RX signal path via wr:1 windings. Therefore, in accordance with the present invention, a small signal on the line being received can be stepped up, while on the transmit side on the other hand, a stepping down can occur. Therefore in accordance with the present invention, if on the transmit side 455 the wt is ⅔, a wr of 2 on the receive side 457 would, in essence, provide a ratio of 1 to 3 between the transmit and receive transformer windings. As set forth in FIG. 12 common core 459 is provided with three windings thereon, namely tip/ring winding 461*a*, transmit side winding 461*b* and receive side winding 461*c*. The transformer is thereby optimizable to provide the best signal to noise ratio for the transceiver.

Referring again back to FIG. 4*b*, in one embodiment implementing the present invention, a modem operating in half-duplex mode typically leaves the transmitter connected full-time to the hybrid and transformer devices performing 4-wire to 2-wire conversion from modem to line, even though it is not active while a signal is being received. From a signal perspective, this has no consequence. However, the noise contribution from the transmitter output to the receiver input can be significant in a low-power signal environment. The addition of simple switch 435(e.g., a two transistor transmission gate in CMOS technology) between the output of the transmitter (e.g., filter 430) and hybrid 440 reduces noise injected at the receiver input and therefore may substantially improve receiver S/N ratio. Activation of the switch can be incorporated into an automatic gain control loop with the minimum gain control setting causing the switch to turn off. Alternatively, a specific gain control code can be assigned to activate the switch, which can then be turned off (disabled) and on (enabled) in a directed manner.

As can be seen in the typical NID depicted in FIG. 4*b*, electronic hybrid 440 feeds signal from the transmitter back into the receiver. VGA 470 has two pairs of inputs, one fed back from the transmitter, the other a receive input from line 106. Any signal coming out of the transmitter causes a self-echo path (e.g., through the transformer depicted in FIG. 12) into the receiver that should be suppressed, such that the receiver does not get confused as to whether such self-echo is a signal coming from line 106. Noise also can get injected into the receiver from the transmitting side, even during times when there is no transmitting, since the electronics components in the transmitting path can contribute noise, even when idle.

Therefore, in accordance with the present invention, when the transmitter is not transmitting, transmit-off switch 435, provided in the transmitting path, is switched off thereby blocking noise from getting injected back into the receive path, which would deteriorate receiver performance. As can be seen in FIG. 4b, in the preferred embodiment the switch is located proximate to the end of the transmit path, i.e., just before combined electronic hybrid 440.

Those skilled in the art can appreciate that, while the present invention has been specifically described in conjunction with telephone lines in a home networking environment, other equivalent transmission medium could be used to implement the present invention. For example, the transmission medium for the frame-based communications network could include power lines interconnecting transmitting and receiving stations.

What is claimed is:

1. A method of noise reduction for a received signal in a transceiver communicating frames over a transmission medium in a frame-based communications network comprising:
   providing a transceiver transmit path and a transceiver receive path in the transceiver;
   locating a blocking switch in the transceiver transmit path, the blocking switch allowing transmit signal propagation when enabled, while preventing both transmit signal propagation and circuit device noise coupling from the transceiver transmit path to the transceiver receive path when the blocking switch is disabled so as to reduce noise in the received signal; and
   disabling the blocking switch when the transceiver transmit path is not transmitting frames over the frame-based communications network.

2. The method of claim 1, wherein the circuit device noise coupling from the transceiver transmit path to the transceiver receive path is through a transformer providing conversion from four wire transmit receive lines to a two wire line.

3. The method of claim 1, wherein the blocking switch is located proximate to the transmission medium.

4. The method of claim 3, wherein the transmission medium is a twisted pair wire.

5. The method of claim 4, wherein the twisted pair wire is a telephone line.

6. A switch apparatus for providing noise reduction for a received signal in a transceiver communicating frames over a transmission medium in a frame-based communication network, the transceiver having a transceiver transmit path and a transceiver receive path, comprising:
   a blocking switch locatable in the transceiver transmit path, the blocking switch having an input port and an output port allowing transmit signal propagation through the blocking switch and along the transceiver transmit path when enabled, the blocking switch further including enable/disable control to disable the blocking switch when the transceiver transmit path is not transmitting frames over the frame-based communications network preventing both transmit signal propagation and circuit device noise coupling from the transceiver transmit path to the transceiver receive path when the blocking switch is disabled so as to reduce noise in the received signal.

7. The switch apparatus of claim 6, wherein the circuit device noise coupling from the transceiver transmit path to the transceiver receive path is from an output port through a transformer providing conversion from four wire transmit receive lines to a two wire line.

8. The switch apparatus of claim 6, wherein the output port of the blocking switch is locatable proximate to the transmission medium.

9. The switch apparatus of claim 8, wherein the transmission medium is twisted pair wire.

10. The switch apparatus of claim 9, wherein the twisted pair wire is a telephone line.

* * * * *